United States Patent
Zhang et al.

(10) Patent No.: US 10,721,023 B2
(45) Date of Patent: Jul. 21, 2020

(54) ELECTRONIC DEVICE, RADIO COMMUNICATION APPARATUS, AND RADIO COMMUNICATION METHOD

(71) Applicant: Sony Corporation, Tokyo (JP)

(72) Inventors: Zaichen Zhang, Nanjing (CN); Rong Zeng, Nanjing (CN); Penshun Lu, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/474,566

(22) PCT Filed: Dec. 26, 2017

(86) PCT No.: PCT/CN2017/118509
§ 371 (c)(1),
(2) Date: Jun. 28, 2019

(87) PCT Pub. No.: WO2018/126940
PCT Pub. Date: Jul. 12, 2018

(65) Prior Publication Data
US 2019/0334657 A1    Oct. 31, 2019

(30) Foreign Application Priority Data
Jan. 6, 2017    (CN) .......................... 2017 1 0011214

(51) Int. Cl.
*H04L 5/12* (2006.01)
*H04L 1/06* (2006.01)
(Continued)

(52) U.S. Cl.
CPC .......... *H04L 1/0681* (2013.01); *H04B 7/0456* (2013.01); *H04B 7/086* (2013.01); *H04B 7/0897* (2013.01); *H04L 1/0668* (2013.01)

(58) Field of Classification Search
CPC ....... H04L 1/0681; H04L 1/0668; H04L 1/06; H04B 7/0456; H04B 7/086; H04B 7/0897; H04B 7/024; H04B 7/046
See application file for complete search history.

(56) References Cited

U.S. PATENT DOCUMENTS

2009/0161644 A1* 6/2009 Suzuki .................. H04W 72/10
370/341
2016/0270017 A1* 9/2016 Palanki ............ H04W 56/0015
(Continued)

FOREIGN PATENT DOCUMENTS

| CN | 103095399 A | 5/2013 |
| CN | 103259582 A | 8/2013 |

(Continued)

OTHER PUBLICATIONS

International Search Report and Written Opinion dated Feb. 8, 2018 for PCT/CN2017/118509 filed on Dec. 26, 2017, 9 pages including English Translation of the International Search Report.

*Primary Examiner* — Dhaval V Patel
(74) *Attorney, Agent, or Firm* — Xsensus LLP

(57) ABSTRACT

The disclosure relates to an electronic device, radio communication apparatus, and radio communication method. In one embodiment, an electronic device utilized at base station side comprises a processing circuit configured to: acquire information of an arrival time difference of diversity signals transmitted from two or more base stations to a mobile terminal; determine, on the basis of the information, a precoding matrix utilized in diversity signal transmission to reduce an impact of the arrival time difference on a diversity gain; and utilize the determined precoding matrix to perform precoding on a signal to be transmitted.

19 Claims, 12 Drawing Sheets

(51) Int. Cl.
*H04B 7/0456* (2017.01)
*H04B 7/08* (2006.01)

(56) References Cited

U.S. PATENT DOCUMENTS

2017/0339575 A1* 11/2017 Kim ..................... G01S 5/0054
2017/0373745 A1* 12/2017 Park ..................... H04B 7/0456

FOREIGN PATENT DOCUMENTS

CN          103299667 A      9/2013
WO       2010/130101 A1    11/2010

* cited by examiner

ELECTRONIC DEVICE, RADIO COMMUNICATION APPARATUS, AND RADIO COMMUNICATION METHOD

CROSS-REFERENCE TO RELATED APPLICATIONS

The present application is based on PCT filing PCT/CN2017/118509, filed Dec. 26, 2017, which claims priority to CN 201710011214.2, filed Jan. 6, 2017, the entire contents of each are incorporated herein by reference.

FIELD

The present disclosure generally relates to the field of wireless communication, and in particular to an electronic device, a wireless communication apparatus and a wireless communication method for base station device side, and an electronic device, a wireless communication apparatus and a wireless communication method for mobile terminal side.

BACKGROUND

For the future fifth-generation (5G) mobile communication system, one of the important functions is to perform communication in a high speed mobile scenario. The mobile cellular application scenario under the current high speed mobile environment mainly includes systems such as internet of vehicles (V2x/eV2x) and high speed train (HST). In these scenarios, cell switching occurs frequently due to high speed moving of the high speed train or vehicle, resulting in that a link failure may occur. For the problem, in designing network topology, multiple base stations or roadside device units (RSUs) geographically adjacent are generally combined to form a logical cell. A mobile station is unnecessary to perform cell switching when performing switching between different base stations/RSUs in the same logical cell. With the method, a frequency of performing cell switching by the mobile station during the high speed moving process is greatly reduced, thereby reducing a possibility of the link failure. In addition, since the same logical cell includes multiple base stations/RSUs, multiple/all base stations/RSUs in the logical cell generally transmit the same signal to the same mobile station to realize spatial diversity, in order to improve the anti-fading performance of the system.

SUMMARY

The brief summary of the present disclosure is given in the following, so as to provide basic understanding on certain aspects of the present disclosure. It should be understood that, the summary is not exhaustive summary of the present disclosure. The summary is neither intended to determine key or important parts of the present disclosure, nor intended to limit the scope of the present disclosure. An object of the present disclosure is to provide some concepts in a simplified form, as preamble of the detailed description later.

According to an embodiment, an electronic device for base station side is provided. The electronic device includes a processing circuit configured to: acquire information on a time-difference-of-arrival (TDOA) of diversity signals transmitted from two or more stations to a mobile terminal: determine a pre-coding matrix for transmission of the diversity signals based on the information so that an influence of the TDOA on a diversity gain is reduced; and pre-code a signal to be transmitted with the determined pre-coding matrix.

According to another embodiment, a wireless communication apparatus for base station side is provided. The wireless communication apparatus includes a transceiving device and a processing circuit. The processing circuit is configured to: acquire information on a TDOA of diversity signals transmitted from two or more base stations to a mobile terminal; determine a pre-coding matrix for transmission of the diversity signals based on the information so that an influence of the TDOA on a diversity gain is reduced; pre-code a signal to be transmitted with the determined pre-coding matrix; and control the transceiving device to transmit the pre-coded signal.

According to another embodiment, a wireless communication method for base station side is provided. The method includes: acquiring information on a TDOA of diversity signals transmitted from two or more base stations to a mobile terminal; determining a pre-coding matrix for transmission of the diversity signals based on the information so that an influence of the TDOA on a diversity gain is reduced; and pre-coding a signal to be transmitted with the determined pre-coding matrix.

According to another embodiment, an electronic device for mobile terminal side is provided. The electronic device includes a processing circuit configured to: perform control to receive, from two or more base stations, diversity signals pre-coded with a pre-coding matrix. The pre-coding matrix is determined based on information on a TDOA of diversity signals transmitted from the two or more base stations to the mobile terminal, so that an influence of the TDOA on a diversity gain is reduced.

According to another embodiment, a wireless communication apparatus for mobile terminal side is provided. The wireless communication apparatus includes a transceiving device and a processing circuit. The processing circuit is configured to: control the transceiving device to receive, from two or more base stations, diversity signals pre-coded with a pre-coding matrix. The pre-coding matrix is determined based on information on a TDOA of diversity signals transmitted from the two or more base stations to the mobile terminal, so that an influence of the TDOA on a diversity gain is reduced.

According to another embodiment, a wireless communication method for mobile terminal side is provided. The method includes: receiving, from two or more base stations, diversity signals pre-coded with a pre-coding matrix. The pre-coding matrix is determined based on information on a TDOA of diversity signals transmitted from the two or more base stations to the mobile terminal, so that an influence of the TDOA on a diversity gain is reduced.

According to the embodiments of the present disclosure, the diversity gain can be improved, thereby effectively suppressing an influence on system performances from fading.

BRIEF DESCRIPTION OF THE DRAWINGS

The present disclosure may be understood better with reference to the following description in conjunction with the drawings. Throughout all the drawings, the same or similar reference numerals indicate the same or similar component. The drawings and the detailed description in the following are included in the specification and form a part of the specification, and are used to illustrate preferred embodiments of the present disclosure and explain principles and advantages of the present disclosure by examples.

DETAILED DESCRIPTION

Figure 1:
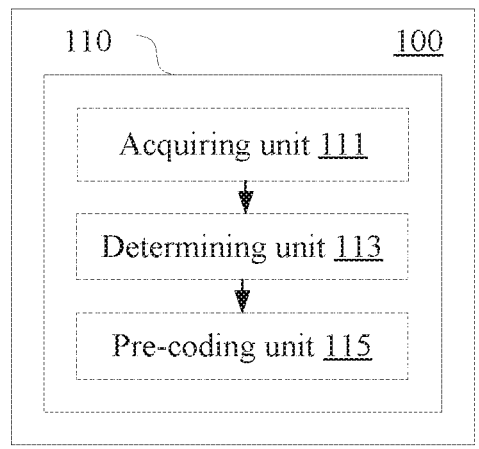
FIG. 1 is a block diagram showing a configuration example of an electronic device for base station side according to an embodiment of the present disclosure.

Embodiments of the present disclosure are described with reference to the drawings hereinafter. Elements and features described in one drawing or one embodiment of the present disclosure may be combined with elements and features illustrated in one or more other drawings or embodiments. It should be noted that, for clearness, illustration and description of components and processing irrelevant to the present disclosure and known by those skilled in the art are omitted in the drawings and illustration.

As shown in FIG. 1, an electronic device 100 for base station side according to an embodiment includes a processing circuit 110. The processing circuit 110 may be implemented as a specific chip, a chipset or a central processing unit (CPU) and so on.

The processing circuit 110 includes an acquiring unit 111, a determining unit 113 and a pre-coding unit 115. It is to be noted that, although the acquiring unit 111, the determining unit 113 and the pre-coding unit 115 are shown as functional blocks in FIG. 1, it should be understood that functions of the units may be implemented by the processing circuit 110 as a whole, and are not necessarily implemented by actual discrete components of the processing circuit 110. In addition, although the processing circuit 110 is shown by one block in FIG. 1, the electronic device 100 may include multiple processing circuits, and the acquiring unit 111, the determining unit 113 and the pre-coding unit 115 may be distributed in multiple processing circuits, thereby achieving the functions by collaborative operations of the multiple processing circuits.

Figure 10:
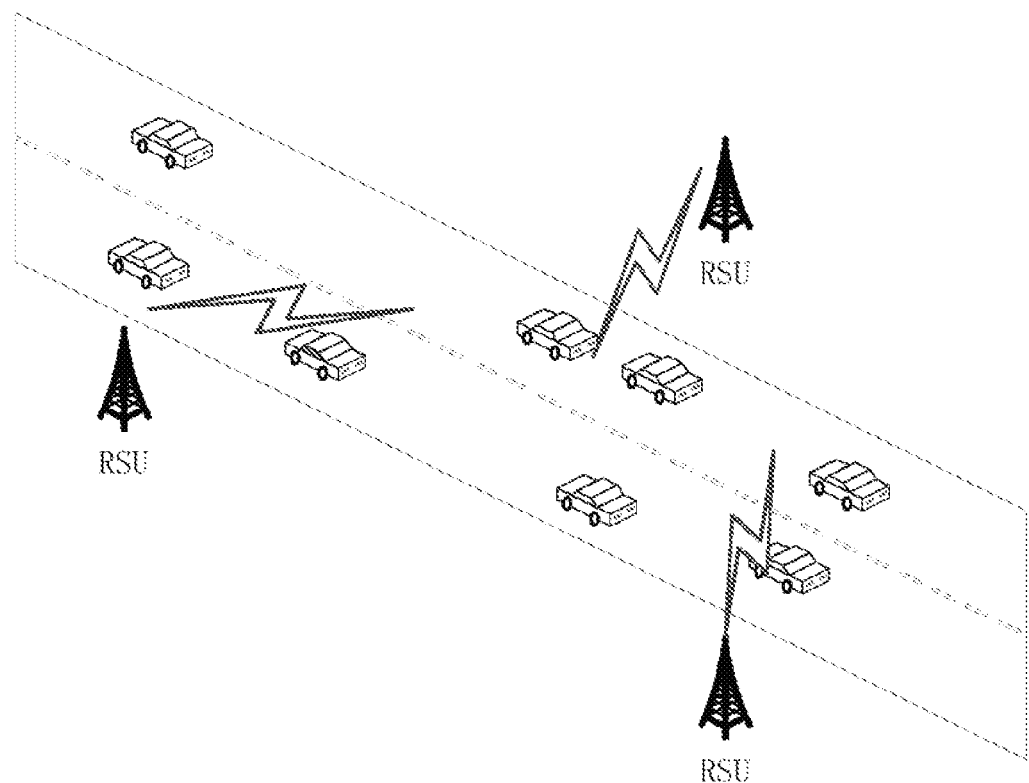
FIG. 10 and FIG. 11 are schematic diagrams showing examples of an application scenario according to an embodiment of the present disclosure.
Figure 11:
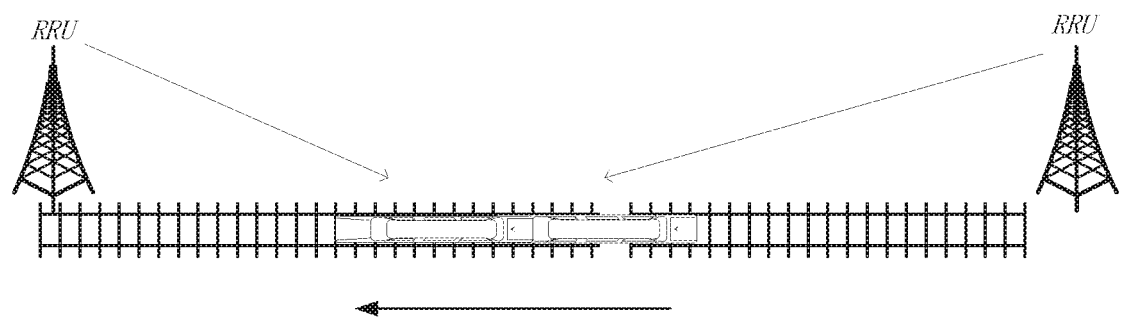

As described above, the scenario adapted to the embodiment of the present disclosure includes systems such as internet of vehicles and a railway mobile communication network. FIG. 10 shows an exemplary scenario of the internet of vehicles, in which multiple RSUs, as transmitting ends, transmit signals to vehicles as mobile terminals. In addition. FIG. 11 shows an exemplary scenario of a railway, in which multiple remote radio frequency units (RRUs) as transmitting ends transmit signals to a train as a mobile terminal. In a case of adopting spatial diversity, since distances from multiple base stations/RSUs/RRUs to the mobile terminal are different, the transmitted signals reach the receiving end at different time, resulting in inter-symbol interference, inter-subcarrier interference and diversity gain loss and so on.

Specifically, the inter-symbol interference refers to interference between symbols, which reduces the capability of suppressing noises by the system. The inter-subcarrier interference is generated since orthogonality between subcarriers is destroyed, which also reduces the capability of suppressing noises by the system. In addition, the diversity gain is one of the main manners for suppressing fading in the wireless communication system. An instant signal-to-noise ratio of the system fluctuates due to fading, resulting in deterioration of a bit error rate performance of the system.

Presently, in order to solve the above problem. for an LTE (long term evolution) system, a conventional method is suppressing the inter-symbol interference and the inter-subcarrier interference due to the TDOA by increasing a length of a cyclic prefix. With this method, the interference can be suppressed, but the receiving end cannot obtain a full diversity gain provided by the system since transmission diversity coding matrices are still not orthogonal, resulting in a performance loss.

According to the embodiment, the acquiring unit 111 is configured to acquire information on a TDOA of diversity signals transmitted from two or more base stations to a mobile terminal.

According to specific embodiments, the information on the TDOA of the diversity signals reaching the mobile terminal may be estimated based on position information of the mobile terminal, or may be measured and reported by the mobile terminal, for example.

The determining unit 113 is configured to determine a pre-coding matrix for transmission of the diversity signals based on information acquired by the acquiring unit 111, so that an influence of the TDOA on a diversity gain is reduced.

The process of determining the pre-coding matrix for transmission of the diversity signals may include constructing a pre-coding matrix based on the information on the TDOA, or selecting an appropriate pre-coding matrix from predetermined pre-coding matrices.

According to an embodiment, the determining unit 113 may be configured to compensate a difference of channel parameters of symbols involved in transmission diversity coding according to the TDOA. so that orthogonality of the pre-coding matrix is improved as compared with a case where the TDOA is not considered.

Specifically, the pre-coding matrix determined by the determining unit 113 may, for example, include a phase rotation factor determined according to the TDOA. The rotation factor causes a phase rotation of a coded symbol transmitted on at least one sub-carrier.

The pre-coding unit 115 is configured to pre-code a signal to be transmitted with the pre-coding matrix determined by the determining unit 113.

Multiple transmitting ends (base stations/RRUs/RSUs) located at different geographical positions transmit information coded with the transmission diversity pre-coding matrix according to the embodiment of the present disclosure, so that an influence of the TDOA on a diversity gain is reduced, thereby improving the diversity gain as compared with the conventional method (ideally, a full diversity gain can be obtained), and thus effectively suppressing an influence on the system performance from fading.

Subsequently, an exemplary manner in which an orthogonality recovering pre-coding matrix is selected or constructed based on the position information of the mobile terminal or the received signal TDOA information measured and reported, and information symbols to be transmitted are pre-coded with the matrix to improve a diversity gain, is described in conjunction with specific examples. In the following examples, a transmission diversity pre-coding mode in a third generation partnership project (3GPP) LTE standard is adopted. However, it should be understood that the embodiments of the present disclosure are not limited to specific details given in the following examples for illustration.

Embodiments of the pre-coding matrix are described respectively in cases of a two antenna transmission diversity and a four antenna transmission diversity. Firstly, for the two antenna transmission diversity, the existing pre-coding process may be expressed by the following equation (1):

$$\begin{bmatrix} Z_{2k}^{(1)} \\ Z_{2k}^{(2)} \\ Z_{2k+1}^{(1)} \\ Z_{2k+1}^{(2)} \end{bmatrix} = \frac{1}{\sqrt{2}} \underbrace{\begin{bmatrix} 1 & 0 & j & 0 \\ 0 & -1 & 0 & j \\ 0 & 1 & 0 & j \\ 1 & 0 & -j & 0 \end{bmatrix}}_{\text{pre-coding matrix}} \begin{bmatrix} \text{Re}(X_k) \\ \text{Re}(X_{k+1}) \\ \text{Im}(X_k) \\ \text{Im}(X_{k+1}) \end{bmatrix} \quad (1)$$

In the equation (1), $Z_i^{(p)}$ represents an i-th pre-coding symbol transmitted by a p-th transmission antenna, $X_k$ represents an information symbol transmitted on a k-th subcarrier, $j=\sqrt{-1}$, Re(•) represents a real part extraction of a symbol, and Im (•) represents an imaginary part extraction of a symbol. For the above transmission diversity mode, in order to ensure that the receiving end can obtain the full diversity gain provided by the system, frequency domain impulse responses of wireless channels between respective transmitting ends and the receiving end should have the same coefficient at adjacent subcarrier positions. In a case where a TDOA exists, the frequency domain impulse responses of the wireless channels have different coefficients at adjacent subcarrier positions, and the coefficients differ from each other by one phase rotation factor. Due to the factor, the receiving end cannot obtain the full diversity gain provided by the system. The rotation factor is related to the parameter TDOA. After the transmitting end obtains the parameter TDOA, the phase rotation factor may be calculated. The factor is compensated in advance at the transmitting end, thereby recovering orthogonality of the transmission diversity pre-coding matrix and obtaining the full diversity gain.

For the two antenna system, the rotation factor γ may be expressed by the following equation (2):

$$\gamma = e^{-j\frac{2\pi\tau}{N}} \quad (2)$$

In the equation (2), τ represents the parameter TDOA, that is, difference of time instants when signals transmitted from a transmitting end 1 and a transmitting end 2 reach the receiving end. Then, phase ration between adjacent subcarriers is compensated with γ, thereby recovering orthogonality between transmission diversity pre-coding matrices and obtaining the full diversity gain.

The improved two antenna transmission diversity pre-coding process according to the exemplary embodiment may be expressed by the following equation (3):

$$\begin{bmatrix} Z_{2k}^{(1)} \\ Z_{2k}^{(2)} \\ Z_{2k+1}^{(1)} \\ Z_{2k+1}^{(2)} \end{bmatrix} = \frac{1}{\sqrt{2}} \underbrace{\begin{bmatrix} 1 & 0 & j & 0 \\ 0 & -1 & 0 & j \\ 0 & 1 & 0 & j \\ e^{j\frac{2\pi\tau}{N}} & 0 & e^{j(\frac{2\pi\tau}{N}-\frac{\pi}{2})} & 0 \end{bmatrix}}_{\text{pre-coding matrix}} \begin{bmatrix} \text{Re}(X_k) \\ \text{Re}(X_{k+1}) \\ \text{Im}(X_k) \\ \text{Im}(X_{k+1}) \end{bmatrix} \quad (3)$$

Similarly, for the four antenna transmission diversity pre-coding, the existing pre-coding process may be expressed by the following equation (4):

$$\begin{bmatrix} Z_{4k}^{(1)} \\ Z_{4k}^{(2)} \\ Z_{4k}^{(3)} \\ Z_{4k}^{(4)} \\ Z_{4k+1}^{(1)} \\ Z_{4k+1}^{(2)} \\ Z_{4k+1}^{(3)} \\ Z_{4k+1}^{(4)} \\ Z_{4k+2}^{(1)} \\ Z_{4k+2}^{(2)} \\ Z_{4k+2}^{(3)} \\ Z_{4k+2}^{(4)} \\ Z_{4k+3}^{(1)} \\ Z_{4k+3}^{(2)} \\ Z_{4k+3}^{(3)} \\ Z_{4k+3}^{(4)} \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \text{Re}(X_k) \\ \text{Re}(X_{k+1}) \\ \text{Re}(X_{k+2}) \\ \text{Re}(X_{k+3}) \\ \text{Im}(X_k) \\ \text{Im}(X_{k+1}) \\ \text{Im}(X_{k+2}) \\ \text{Im}(X_{k+3}) \end{bmatrix} \quad (4)$$

Since there are four transmission antennas, there are three phase rotation factors, which are respectively expressed by the following equations (5a), (5b) and (5c):

$$\gamma_1 = e^{-j\frac{2\pi\tau_{1,2}}{N}} \quad (5a)$$

$$\gamma_2 = e^{-j\frac{2\pi\tau_{1,3}}{N}} \quad (5b)$$

$$\gamma_3 = e^{-j\frac{2\pi\tau_{1,4}}{N}} \quad (5c)$$

In the equations (5a), (5b) and (5c), $\tau_{i,k}$ represents the parameter TDOA, that is, difference of time instants when signals transmitted from a transmitting end i and a transmitting end k reach the receiving end. Phase rotation between adjacent subcarriers is compensated by using $\gamma_1$, $\gamma_2$, $\gamma_3$, thereby recovering orthogonality between transmission diversity pre-coding matrices and obtaining the full diversity gain.

The improved four antenna transmission diversity pre-coding process according to the exemplary embodiment may be expressed by the following equation (6):

$$\begin{bmatrix} Z_{4k}^{(1)} \\ Z_{4k}^{(2)} \\ Z_{4k}^{(3)} \\ Z_{4k}^{(4)} \\ Z_{4k+1}^{(1)} \\ Z_{4k+1}^{(2)} \\ Z_{4k+1}^{(3)} \\ Z_{4k+1}^{(4)} \\ Z_{4k+2}^{(1)} \\ Z_{4k+2}^{(2)} \\ Z_{4k+2}^{(3)} \\ Z_{4k+2}^{(4)} \\ Z_{4k+3}^{(1)} \\ Z_{4k+3}^{(2)} \\ Z_{4k+3}^{(3)} \\ Z_{4k+3}^{(4)} \end{bmatrix} = \frac{1}{\sqrt{2}} \underbrace{\begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ e^{j\frac{2\pi\tau_{1,3}}{N}} & 0 & 0 & 0 & e^{j\left(\frac{2\pi\tau_{1,3}}{N}-\frac{\pi}{2}\right)} & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & e^{j\frac{2\pi\tau_{1,2}}{N}} & 0 & 0 & 0 & e^{j\left(\frac{2\pi\tau_{1,4}}{N}-\frac{\pi}{2}\right)} \\ 0 & 0 & 0 & 0 & 0 & 0 & 0 & 0 \\ 0 & 0 & 0 & e^{j\frac{2\pi\tau_{1,2}}{N}} & 0 & 0 & e^{j\left(\frac{2\pi\tau_{1,4}}{N}-\frac{\pi}{2}\right)} & 0 \end{bmatrix}}_{\text{pro-coding matrix}} \begin{bmatrix} \mathrm{Re}(X_k) \\ \mathrm{Re}(X_{k+1}) \\ \mathrm{Re}(X_{k+2}) \\ \mathrm{Re}(X_{k+3}) \\ \mathrm{Im}(X_k) \\ \mathrm{Im}(X_{k+1}) \\ \mathrm{Im}(X_{k+2}) \\ \mathrm{Im}(X_{k+3}) \end{bmatrix} \quad (6)$$

Although specific examples in cases of two antennas and four antennas are described above, the embodiment of the present disclosure is not limited thereto, and the number of antennas may be other values. Generally, after orthogonality recovering pre-coding is performed according to the exemplary embodiment, symbols of respective subcarriers are represented by the following table 1.

TABLE 1

|  | Transmitting end p | Transmitting end q |
|---|---|---|
| Subcarrier m | $X_k$ | $-X_{k+1}^*$ |
| Subcarrier m + 1 | $e^{-j\frac{2\pi \tau_{1,p}}{N}} X_{k+1}$ | $e^{-j\frac{2\pi \tau_{1,q}}{N}} X_k^*$ |

In which, $X_k$ and $X_{k+1}$ represent two symbols involved in transmission diversity coding. The orthogonality recovering coding is equivalent to performing phase rotation on the coded symbols transmitted on a (m+1)-th subcarrier, where a corresponding phase rotation factor is $$\gamma = e^{-j\frac{2\pi \tau_{1,n}}{N}},$$

where $\tau_{1,n}$ is the parameter TDOA, representing the difference of time instants when signals transmitted from a transmitting end 1 and a transmitting n reach the receiving end.

According the above exemplary embodiment, orthogonality between transmission diversity coding matrices is recovered, and the capability of suppressing fading of the system is improved. Ideally, the full diversity gain provided by the system can be obtained.

As described above, the information on the TDOA of the diversity signals reaching the mobile terminal may be estimated based on position information of the mobile terminal. Accordingly, according to an embodiment, the information acquired by the acquiring unit 111 may include the position information of the mobile terminal, and determining the pre-coding matrix by the determining unit 113 may include: estimating the TDOA based on the position information; and determining the pre-coding matrix based on the estimated TDOA.

For example, in an initial state, the transmitting end may have no information on the parameter TDOA. In this case, the transmitting end performs orthogonality recovering transmission diversity pre-coding by estimating the parameter TDOA based on the position information of the mobile terminal (also referred to as "open-loop mode" hereinafter). Specifically, the parameter TDOA may be estimated according to distances from the mobile terminal to different transmitting ends by using the following equation (7):

$$\tau_{i,j} = \frac{\sqrt{(x-x_i)^2 + (y-y_i)^2} - \sqrt{(x-x_j)^2 + (y-y_j)^2}}{c} \quad (7)$$

In the equation (7), (x, y) represents coordinates of a current position of the mobile terminal, $(x_l, y_l)$ represents coordinates of a position of an l-th transmitting end, and c represents the propagation speed of electromagnetic wave.

The transmitting end constructs or selects the corresponding transmission diversity coding matrix according to the estimated parameter TDOA by using the orthogonality recovering transmission diversity pre-coding matrix constructing method, and performs pre-coding on information symbols to be transmitted.

Accordingly, according to an embodiment, the information acquired by the acquiring unit 111 may include the TDOA reported by the mobile terminal.

For example, during the transmission process, a network, for example, transmits a measuring control command to the mobile terminal to instruct (for example, configuring by a measConfig message) the mobile terminal to, for example, periodically measure the parameter TDOA and report the measured parameter to the network (for example, reporting by MeasurementReport). In this case, the transmitting end can construct or select the corresponding transmission diversity coding matrix according to the more accurate parameter TDOA measured and reported by the mobile terminal by using the orthogonality recovering transmission diversity pre-coding matrix constructing method, and performs pre-coding on information symbols to be transmitted (also referred to as "closed-loop mode" hereinafter).

As described above, the process of determining the pre-coding matrix by the determining unit 113 may include constructing a pre-coding matrix, or selecting a pre-coding matrix from predetermined pre-coding matrices.

Specifically, the parameter TDOA in the orthogonality recovering transmission diversity pre-coding matrix changes continuously. However, the parameter TDOA may be discretized, and different discrete values of the discretized TDOA may correspond to instances of respective orthogonality recovering transmission diversity pre-coding matrices. These examples may form a set, which may be referred to as a codebook. The codebook may be stored in a memory of the transmitting end, for example. The quantization bit number of the specific TDOA may be determined by performing simulation according to the network topology structure and the system parameter. Each pre-coding matrix in the codebook corresponds to one index value, which may be referred to as a pre-coding matrix index (PMI) value. The pre-coding matrix in the codebook can be uniquely determined based on the index value. The network may perform interaction on the parameter TDOA information with the mobile terminal by using the PMI value instead of the TDOA value.

The process of determining the pre-coding matrix by selecting may be implemented as follows. According to an embodiment, the determining unit 113 may be configured to calculate a pre-coding matrix index value according to the TDOA, and determine the pre-coding matrix according to a predetermined correspondence between pre-coding matrix index values and candidate matrices.

Alternatively, the pre-coding matrix index value may not be determined at the base station side, and may be calculated at the mobile terminal side according to the TDOA and reported to the base station side. Accordingly, the process of acquiring information on the TDOA by the acquiring unit 111 may include: acquiring the pre-coding matrix index value reported by the mobile terminal. In addition, the determining unit 113 may be configured to determine the pre-coding matrix according to the predetermined correspondence between the pre-coding matrix index values and the candidate matrices.

With the orthogonality recovering codebook manner, storage resources can be saved, and processing efficiency of the system can be improved.

Subsequently, a pre-coding process according to an exemplary embodiment is described with reference to FIG. 12. In the exemplary process, both the open-loop mode and the closed-loop mode are included. However, the embodiment of the present disclosure may include a pre-coding process in which only one of the open-loop mode and the closed-loop mode is adopted.

Figure 12:
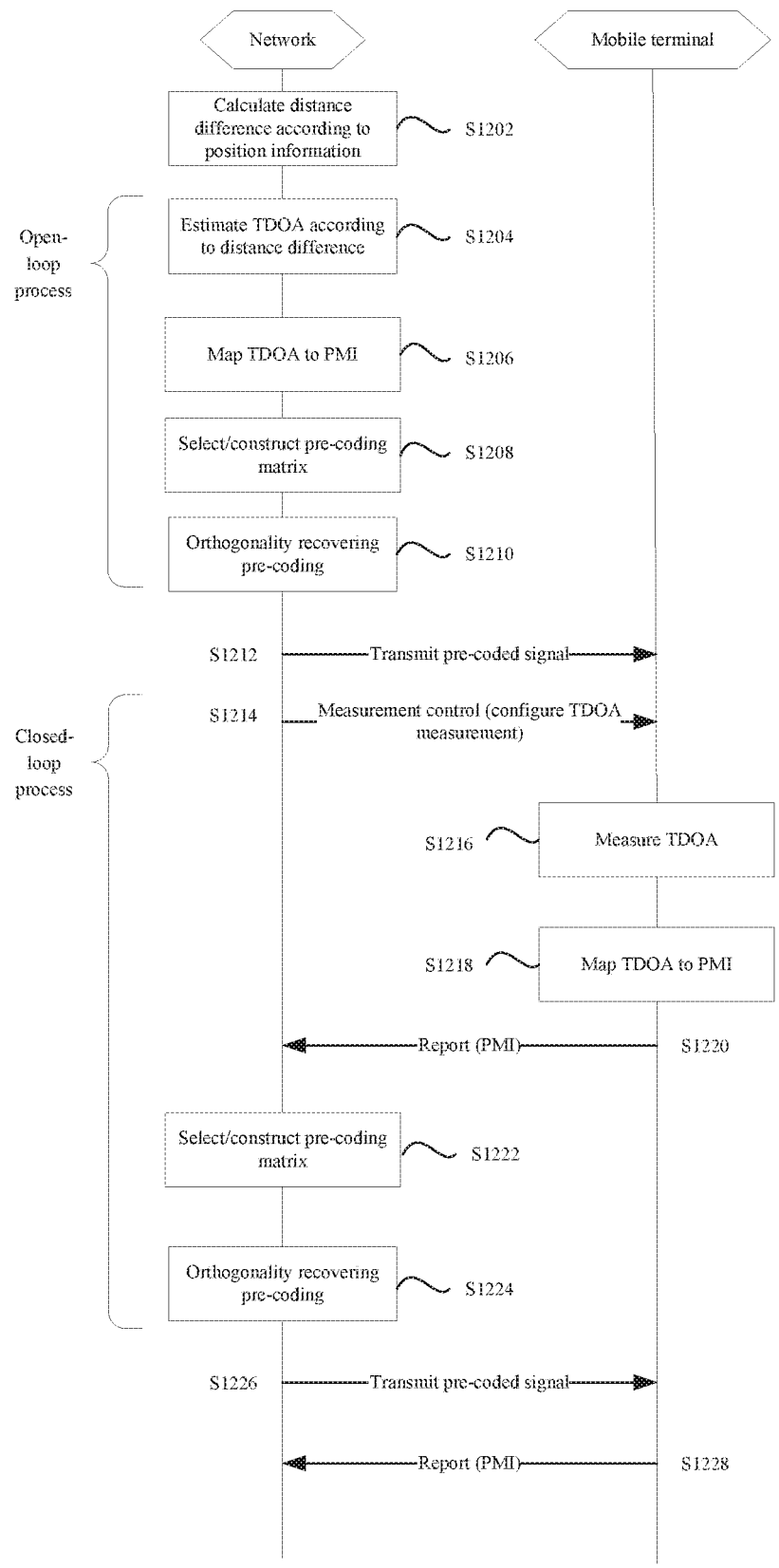
FIG. 12 is a flowchart showing a pre-coding process according to an exemplary embodiment of the present disclosure.

As shown in FIG. 12, in step S1202, a transmitting end calculates difference of distances from a mobile terminal to different transmitting ends according to position information of the mobile terminal.

In step S1204, the transmitting end estimates a parameter TDOA according to the difference of distances.

In step S1206, the transmitting end calculates a pre-coding matrix index (PMI) value according to the estimated parameter TDOA (it should be noted that, step S1206 is optional, and step S1206 is performed so as to select the pre-coding matrix in subsequent step S1208. However, step S1206 may be omitted, and a pre-coding matrix is constructed according to the estimated parameter TDOA in subsequent step S1208).

In step S1208, a pre-coding matrix is selected according to the pre-coding matrix index value, or is constructed according to the estimated parameter TDOA.

In step S1210, information symbols to be transmitted are pre-coded with the pre-coding matrix.

Steps S1204 to S1210 may correspond to the open-loop process described above.

Subsequently, in step S1212. the transmitting end transmits the pre-coded signal to the mobile terminal.

In step S1214, the transmitting end transmits a measurement control message to the mobile terminal, to configure measurement of the parameter TDOA.

In step S1216, the mobile terminal measures the parameter TDOA.

In step S1218, the mobile terminal calculates the pre-coding matrix index (PMI) value according to the parameter TDOA (it should be noted that, step S1218 is optional, and step S1218 is performed to select the pre-coding matrix at network side in subsequent steps. However, step S1218 may be omitted, and the parameter TDOA is reported in subsequent step S1220).

In step S1220, the mobile terminal reports the pre-coding matrix index (PMI) value to a network (or reporting the parameter TDOA).

In step S1222, the transmitting end selects or constructs a pre-coding matrix based on the pre-coding matrix index value.

In step S1224, information symbols to be transmitted are pre-coded with the pre-coding matrix and are transmitted.

Steps S1214 to S1224 may correspond to the closed-loop process described above.

Subsequently, in step S1226, the transmitting end transmits the pre-coded signal to the mobile terminal. In step S1228, a process similar to that in step S1220 is repeated.

With the open-loop control mode, a better diversity gain can be obtained in an initial transmission state of the system. With the closed-loop control mode, the system tracks environment changes in real time during the data transmission process, thereby continuously obtaining a better diversity gain.

Figure 15:
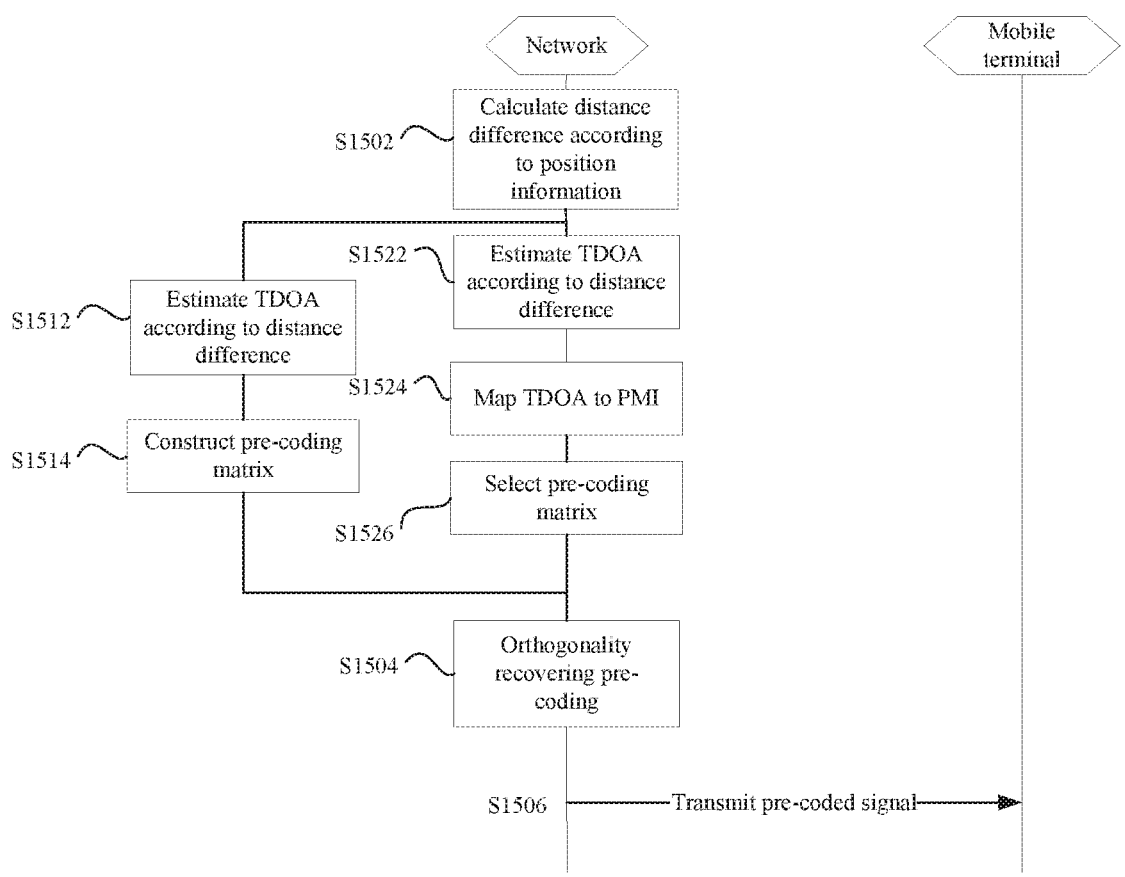
FIG. 15 is a flowchart showing an optional process of constructing a pre-coding matrix with an open-loop mode according to an exemplary embodiment of the present disclosure.

FIG. 15 shows an optional process of constructing a pre-coding matrix with the open-loop mode in more detail.

In step S1502, network side calculates difference of distances from a mobile terminal to different transmitting ends according to position information of the mobile terminal.

Subsequently, in step S1512, a TDOA is estimated according to the difference of distances, and in step S1514, a pre-coding matrix is constructed according to the estimated TDOA. The construction method includes: performing phase rotation on all coded symbols transmitted on a (m+1)-th subcarrier according to an original pre-coding matrix, where a corresponding phase rotation factor is $$\gamma = e^{-j\frac{2\pi\tau_{1,n}}{N}},$$

and $\tau_{1,n}$ represents the estimated parameter TDOA;

alternatively, in step S1522, the TDOA is estimated according to the difference of distances, in step S1524, the TDOA is mapped to PMI, and in step S1326, a pre-coding matrix is selected according to the PMI:

subsequently, in step S1504, pre-coding is performed according to the pre-coding matrix determined by one of the above manners: and in step S1506. pre-coded signals are transmitted to the mobile terminal.

In addition, in the embodiment in which the mobile terminal reports the TDOA, a measurement and reporting period of the TDOA is adjusted adaptively according to a moving speed of the mobile terminal and quantization granularity of the parameter TDOA.

Accordingly, according to an embodiment, the acquiring unit 111 may be further configured to acquire information related to the speed of the mobile terminal, and/or information related to quantization granularity of the TDOA. In addition, the determining unit 113 may be configured to determine a period for reporting the TDOA information by the mobile terminal according to the speed and/or the quantization granularity.

The parameter TDOA is used to select or construct an orthogonality recovering transmission diversity pre-coding matrix, and the parameter TDOA itself changes for different positions of the mobile terminal. Therefore, as the mobile terminal moves with a low speed, the period for reporting the TDOA may be extended. In contrast, as the mobile terminal moves with a high speed, the period for reporting the TDOA may be shortened. In addition, the parameter TDOA may be discretized, and the period for reporting the parameter TDOA may be calculated according to quantization granularity of the parameter TDOA.

Specifically, the reporting period TR may be calculated according to the following equation (8), for example:

$$T_R = \frac{2\Delta_q c}{v}. \tag{8}$$

In the equation (8), v represents a moving speed of the mobile terminal, and $\Delta_q$ represents the quantization granularity of the parameter TDOA. $\Delta_q$ may be estimated according to the following equation (9):

$$\Delta_q = \frac{\tau_{max}}{2^{n-1}} \tag{9}$$

In the equation (9), $\tau_{max}$ represents the maximum value of TDOA, which may be determined according to the network topology structure: and n represents a quantization bit number of TDOA.

The network side may transmit a measurement control message to the mobile terminal, to instruct the mobile terminal to adaptively adjust a measurement period of TDOA.

By adaptively adjusting the measurement and reporting period of TDOA, network transmission resources can be saved.

Figure 13:
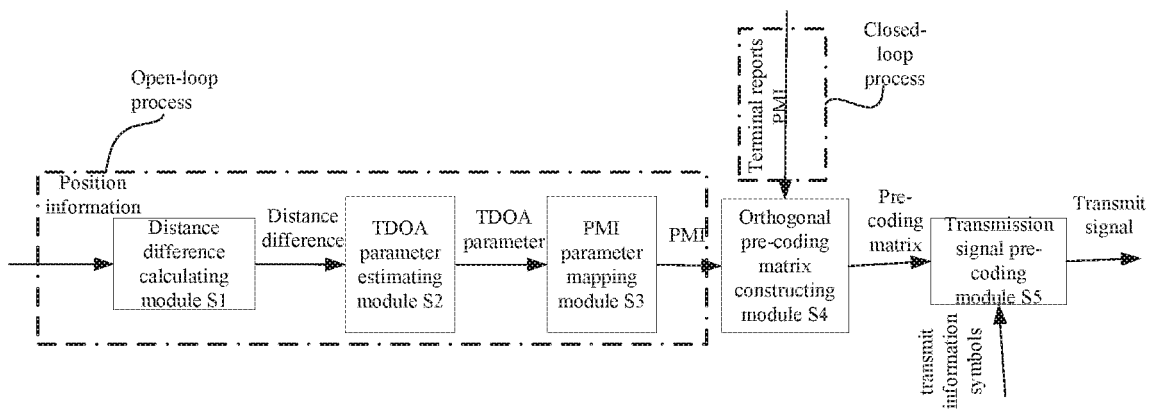
FIG. 13 is a block diagram showing a configuration of base station side apparatus according to an exemplary embodiment of the present disclosure.
Figure 14:
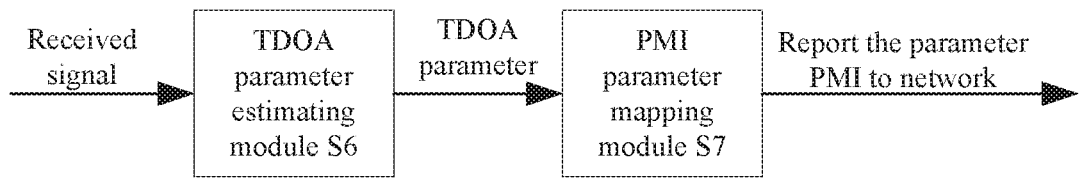
FIG. 14 is a block diagram showing a configuration of mobile terminal side apparatus according to an exemplary embodiment of the present disclosure.

FIG. 13 and FIG. 14 show an input-output relationship between modules of a processing unit during an orthogonality recovering pre-coding process.

FIG. 13 schematically shows a relationship between processing units in a case that a transmitting end is in an open-loop control state and a closed-loop control state. Firstly, in the open-loop control state, position information is inputted to a distance difference calculating module S1. The module S1 outputs the calculated distance difference to a TDOA parameter estimating module S2. The module S2 calculates the parameter TDOA and then outputs the calculated parameter TDOA to a PMI parameter mapping module S3. The module S3 maps the parameter TDOA to a PMI value and outputs the PMI value to an orthogonal pre-coding matrix constructing module S4. The module S4 constructs a coding matrix and then outputs the coding matrix to a transmission signal pre-coding module S5. The module S5 performs transmission pre-coding on the inputted information symbols to be transmitted with the pre-coding matrix outputted from the module S4, to generate a final signal to be transmitted.

As shown in FIG. 14, for the mobile terminal, firstly, a received signal is inputted to a TDOA parameter estimating module S6. The module S6 estimates the parameter TDOA and then outputs the parameter TDOA to a PMI parameter mapping module S7. The module S7 obtains the parameter PMI and then reports the PMI to a network.

Subsequently, a configuration example of a wireless communication apparatus for base station side according to an embodiment of the present disclosure is described with reference to FIG. 2.

Figure 2:
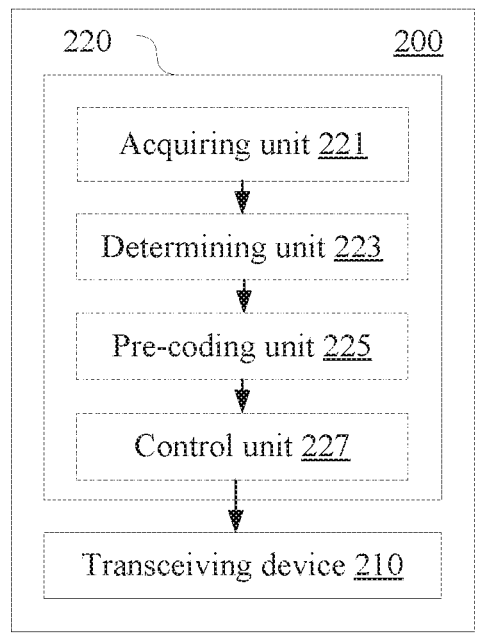
FIG. 2 is a block diagram showing a configuration example of a wireless communication apparatus for base station side according to an embodiment of the present disclosure.

As shown in FIG. 2. a wireless communication apparatus 200 includes a transceiving device 210 and a processing circuit 220. The processing circuit 220 includes an acquiring unit 221. a determining unit 223, a pre-coding unit 225 and a control unit 227. The acquiring unit 221 is configured to acquire information on a TDOA of diversity signals transmitted from two or more base stations to a mobile terminal. The determining unit 223 is configured to determine a pre-coding matrix for transmission of the diversity signals based on the information acquired by the acquiring unit 221. so that an influence of the TDOA on a diversity gain is reduced. The pre-coding unit 225 is configured to pre-code a signal to be transmitted with the pre-coding matrix determined by the determining unit 223. The control unit 227 is configured to control the transceiving device 210 to transmit the coded signal.

Some processes and methods are obviously disclosed during the description of the embodiments of the present disclosure above. Subsequently, a wireless communication method for base station side according to an embodiment of the present disclosure is described without repeating specific details described above.

Figure 3:
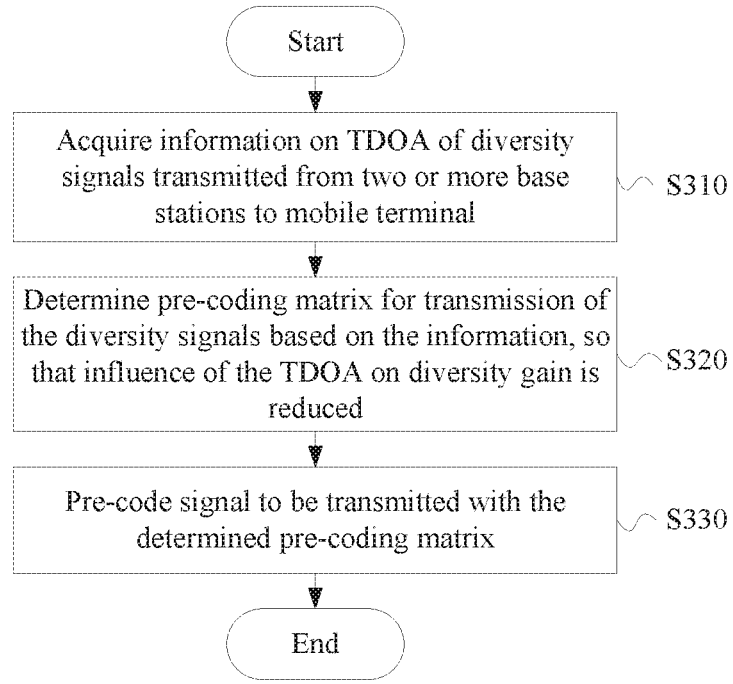
FIG. 3 is a flowchart showing a process example of a wireless communication method for base station side according to an embodiment of the present disclosure.

As shown in FIG. 3, a wireless communication method for base station side according to an embodiment includes the following steps.

In step S310. information on a TDOA of diversity signals transmitted from two or more base stations to a mobile terminal is acquired.

In step S320, a pre-coding matrix for transmission of the diversity signals is determined based on the information, so that an influence of the TDOA on a diversity gain is reduced.

In step S330, a signal to be transmitted is pre-coded with the determined pre-coding matrix.

In addition, corresponding to base station side embodiment, an electronic device, a wireless communication apparatus and a method for mobile terminal side are further disclosed according to embodiments of the present disclosure.

Figure 4:
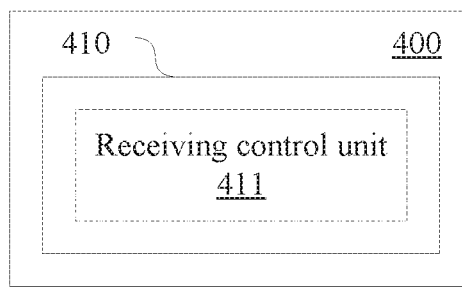
FIG. 4 is a block diagram showing a configuration example of an electronic device for mobile terminal side according to an embodiment of the present disclosure.

As shown in FIG. 4, an electronic device 400 for mobile terminal side according to an embodiment includes a processing circuit 410. The processing circuit 410 includes a receiving control unit 411. The receiving control unit 411 is configured to: perform control to receive, from two or more base stations, diversity signals pre-coded with the pre-coding matrix. The pre-coding matrix is determined based on information on a TDOA of diversity signals transmitted from two or more base stations to a mobile terminal corresponding to the electronic device 400, so that an influence of the TDOA on a diversity gain is reduced.

Figure 5:
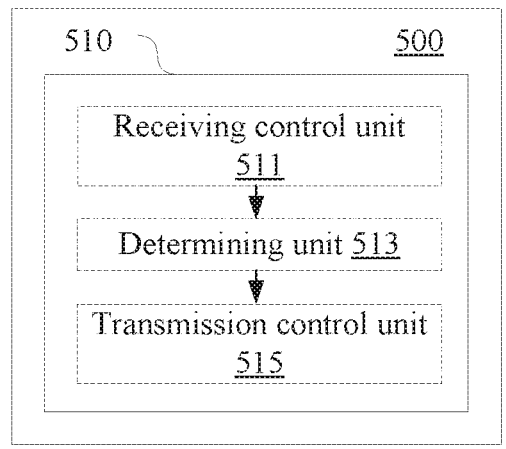
FIG. 5 is a block diagram showing a configuration example of an electronic device for mobile terminal side according to another embodiment of the present disclosure.

In addition, as shown in FIG. 5, an electronic device 500 for mobile terminal side according to an embodiment includes a processing circuit 510. The processing circuit 510 includes a receiving control unit 511, a determining unit 513 and a transmission control unit 515.

The receiving control unit 511 is configured to perform control to receive, from two or more base stations, diversity signals pre-coded with the pre-coding matrix.

The determining unit 513 is configured to determine a TDOA of the received diversity signals.

The transmission control unit 515 is configured to perform control to transmit information on the TDOA to at least one base station.

In addition, according to an embodiment, besides being configured to determine the TDOA, the determining unit 513 is further configured to determine a pre-coding matrix index value according to the TDOA based on a predetermined correspondence. In addition, the transmission control unit 515 may be configured to perform control to transmit the pre-coding matrix index value to at least one base station.

In addition, according to an embodiment, the transmission control unit 515 is further configured to perform control to transmit information on the TDOA with a predetermined period. The period is determined based on a speed of the mobile terminal and/or quantization granularity of the TDOA.

Subsequently, a configuration example of a wireless communication apparatus for mobile terminal side according to an embodiment of the present disclosure is described with reference to FIG. 6.

Figure 6:
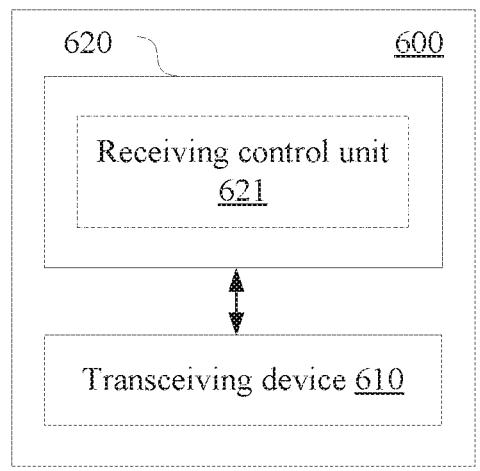
FIG. 6 is a block diagram showing a configuration example of a wireless communication apparatus for mobile terminal side according to an embodiment of the present disclosure.

As shown in FIG. 6, a wireless communication apparatus 600 for mobile terminal side includes a transceiving device 610 and a processing circuit 620. The processing circuit 620 includes a receiving control unit 621. The receiving control unit 621 is configured to control the transceiving device 610 to receive, from two or more base stations, diversity signals pre-coded with a pre-coding matrix. The pre-coding matrix is determined based on information on a TDOA of the diversity signals transmitted from the two or more base stations to the mobile terminal, so that an influence of the TDOA on a diversity gain is reduced.

Figure 7:
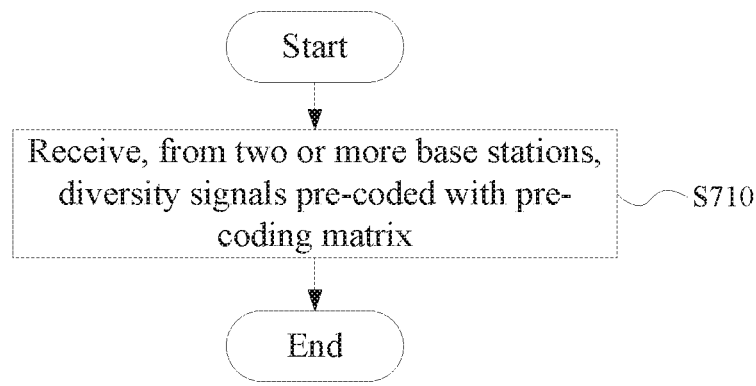
FIG. 7 is a flowchart showing a process example of a wireless communication method for mobile terminal side according to an embodiment of the present disclosure.

In addition, a wireless communication method for mobile terminal side is further provided according to an embodiment of the present disclosure. As shown in FIG. 7, the method includes step S710. In step S710, diversity signals pre-coded with a pre-coding matrix are received from two or more base stations. The pre-coding matrix is determined based on information on a TDOA of the diversity signals transmitted from the two or more base stations to the mobile terminal, so that an influence of the TDOA on a diversity gain is reduced.

Figure 8:
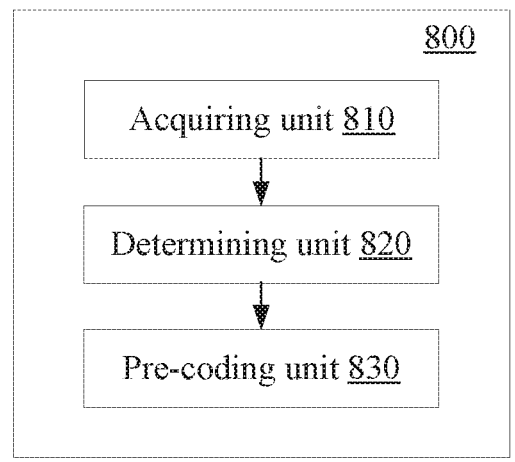
FIG. 8 is a block diagram showing a configuration example of an electronic device for base station side according to an embodiment of the present disclosure.

FIG. 8 shows a configuration example of an electronic device for base station side according to an embodiment of the present disclosure. As shown in FIG. 8, an electronic device 800 for base station side includes: an acquiring unit 810, a determining unit 820 and a pre-coding unit 830. The acquiring unit 810 is configured to acquire information on a TDOA of diversity signals transmitted from two or more base stations to a mobile terminal. The determining unit 820 is configured to determine a pre-coding matrix for transmission of the diversity signals based on the information, so that an influence of the TDOA on a diversity gain is reduced. The pre-coding unit 830 is configured to pre-code a signal to be transmitted with the determined pre-coding matrix.

Figure 9:
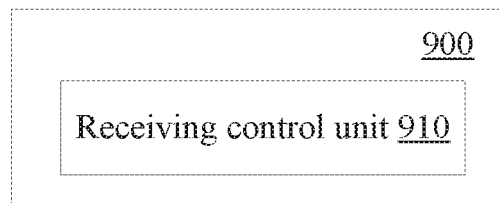
FIG. 9 is a block diagram showing a configuration example of an electronic device for mobile terminal side according to an embodiment of the present disclosure.

FIG. 9 shows a configuration example of an electronic device for mobile terminal side according to an embodiment of the present disclosure. As shown in FIG. 9. an electronic device 900 for mobile terminal side includes a receiving control unit 910. The receiving control unit 910 is configured to perform control to receive, from two or more base stations. diversity signals pre-coded with a pre-coding matrix. The pre-coding matrix is determined based on information on a TDOA of the diversity signals transmitted from the two or more base stations to the mobile terminal, so that an influence of the TDOA on a diversity gain is reduced.

As an example, steps of the above methods and modules and/or units of the above devices may be implemented by software, firmware, hardware or a combination thereof. In a case of implementing by software or firmware, programs constituting software for implementing the above methods are installed to a computer having a dedicated hardware structure (a general-purpose computer 2000 shown in FIG. 16) from a storage medium or a network. The computer can achieve various functions and so on in a case that the computer is installed with various programs.

Figure 16:
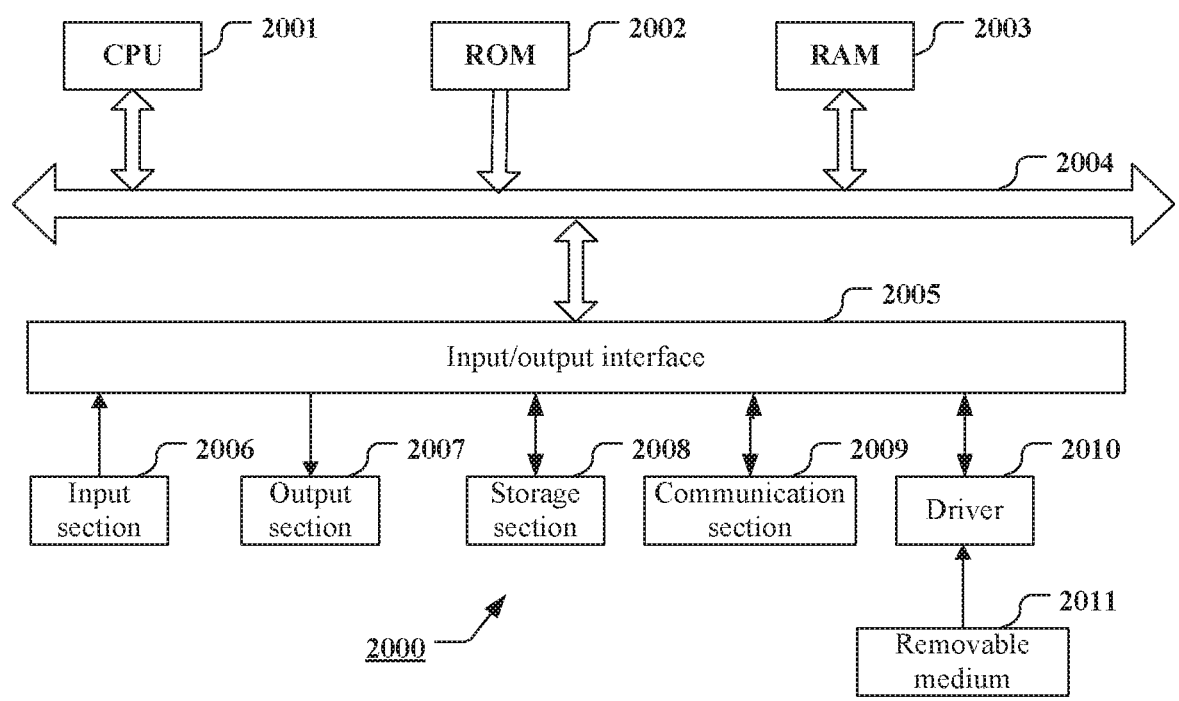
FIG. 16 is a block diagram showing an exemplary structure of a computer for implementing the method and apparatus according to the present disclosure.

In FIG. 16, a central processing unit (CPU) 2001 performs various processing based on programs stored in a read only memory (ROM) 2002 or programs loaded to a random access memory (RAM) 2003 from a storage section 2008. In the RAM 2003, data required when the CPU 2001 performs various processing is stored as needed. The CPU 2001, the ROM 2002 and the RAM 2003 are connected to each other via a bus 2004. An input/output interface 2005 is also connected to the bus 2004.

The following components are connected to the input/output interface 2005: an input section 2006 including a keyboard, a mouse and the like, an output section 2007 including a display such as a Cathode Ray Tube (CRT) and a Liquid Crystal Display (LCD), a speaker and the like, a storage section 2008 including a hard disk and the like, and a communication section 2009 including a network interface card such as a LAN card, a modem and the like. The communication section 2009 performs communication processing via a network such as the Internet. If necessary, a driver 2010 can also be connected to the input/output interface 2005. A removable medium 2011 such as a magnetic disk, an optical disk, a magneto-optical disk, a semiconductor memory and the like is mounted on the driver 2010 as necessary such that a computer program read out therefrom is installed in the storage section 2008 as required.

In a case that the series of processing above is implemented by software, a program constituting the software is installed from the network such as the Internet or the storage medium such as the removable medium 2011.

It is understood by those skilled in the art that the storage medium is not limited to the removable medium 2011 shown in FIG. 16 in which the program is stored and which is distributed separately from the device so as to provide the program to the user. Examples of the removable medium 2011 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 2002, the hard disk contained in the storage section 2008 or the like. Herein, the program is stored in the storage medium, and the storage medium is distributed to the user together with the device containing the storage medium.

A program product storing machine readable instruction codes is further provided according to an embodiment of the present disclosure. The instruction codes, when being read and executed by a machine, may perform the method according to the embodiments of the present disclosure.

Accordingly, a storage medium for carrying the program product storing the machine readable instruction codes is further provided according to the present disclosure. The storage medium includes but not limited to a floppy disk, an optical disk, a magnetic-optic disk, a storage card, and a memory stick and so on.

The embodiments of the present disclosure also relate to the following electronic apparatus. In a case that the electronic apparatus is applied to base station side, the electronic apparatus may be implemented as any type of evolved node B (eNB) such as a macro eNB and a small eNB. The small eNB may be an eNB covering a cell smaller than a macro cell, such as a pico eNB, a micro eNB and a home (femto) eNB. Alternatively, the electronic apparatus may be implemented as any other type of base station, such as the Node B and a base transceiver station (BTS). The base station may include: a body configured to control wireless communication (also referred to as a base station device): and one or more remote radio heads (RRHs) arranged at a position different from the position of the body. In addition, the various types of terminals described in the following may operate as a base station by performing the base station function temporarily or in a semi-persistence manner.

In a case that the electronic apparatus is applied to user equipment side, the electronic apparatus may be implemented as a mobile terminal (such as a smartphone, a tablet personal computer (PC), a notebook type PC, a portable game terminal, a portable/dongle mobile router and a digital camera) or a vehicle-mounted terminal (such as an automobile navigation device). In addition, the electronic apparatus may be a wireless communication module (such as an integrated circuit module including one or more wafers) installed in each of the above terminals.

Application Example on a Terminal Device

Figure 17:
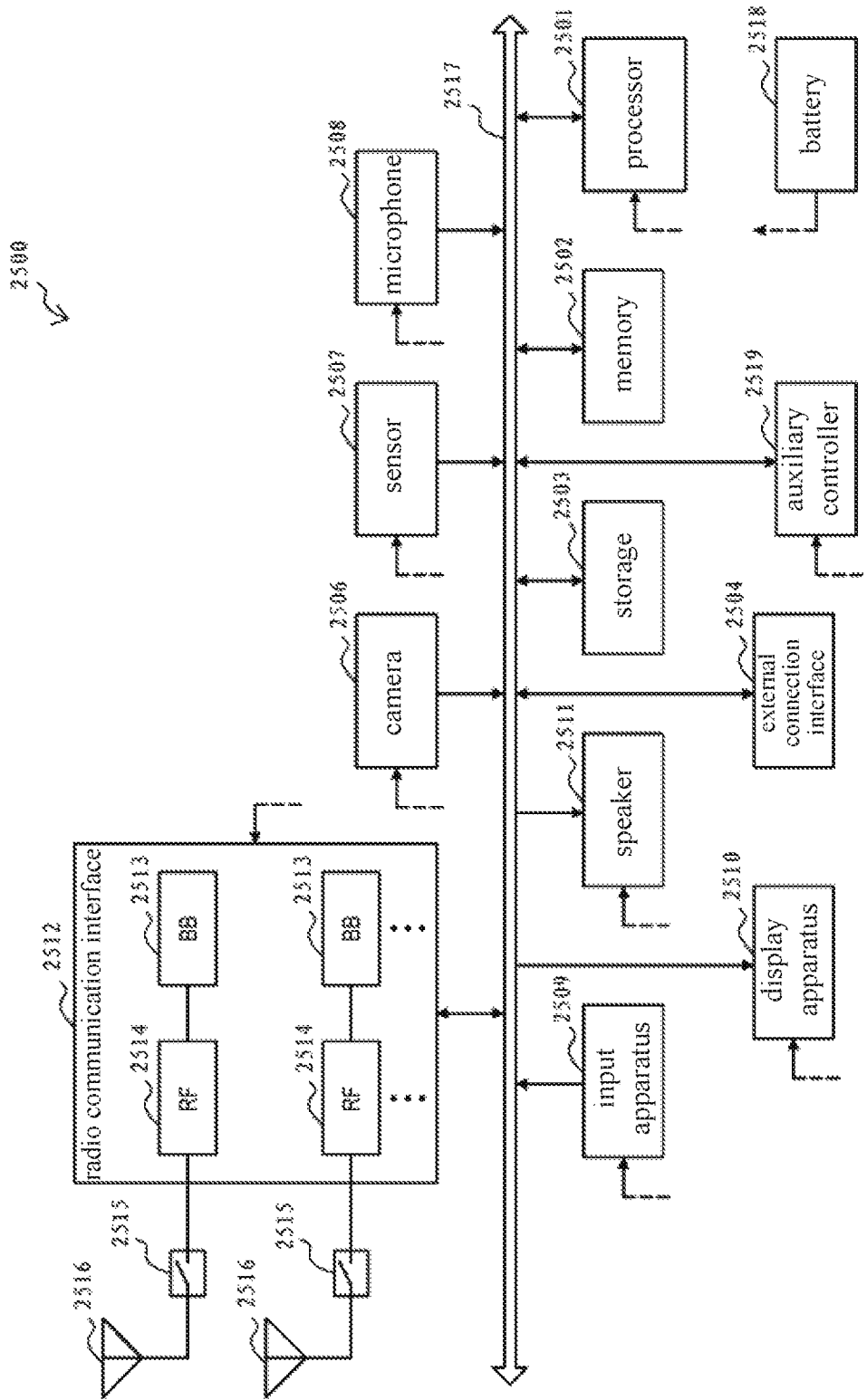
FIG. 17 is a block diagram showing an example of a schematic configuration of a smartphone to which the technology of the present disclosure may be applied.

FIG. 17 is a block diagram showing an example of a schematic configuration of a smart phone 2500 to which the technology of the present disclosure may be applied. The smart phone 2500 includes: a processor 2501, a memory 2502, a storage apparatus 2503, an external connection interface 2504, a camera 2506, a sensor 2507, a microphone 2508. an input apparatus 2509, a display apparatus 2510, a speaker 2511, a radio communication interface 2512, one or more antenna switches 2515. one or more antennas 2516, a bus 2517, a battery 2518 and an auxiliary controller 2519.

The processor 2501 may be for example a CPU or a system on chip (SoC), and control functions of an application layer and other layers of the smart phone 2500. The memory 2502 includes an RAM and an ROM, and stores programs executed by the processor 2501 and data. The storage apparatus 2503 may include a storage medium, such as a semiconductor memory and a hard disk. The external connection interface 2504 is an interface configured to connect an external apparatus (such as a memory card and a universal serial bus (USB) device) to the smart phone 2500.

The camera 2506 includes an image sensor (such as a charge coupled device (CCD) and a complementary metal oxide semiconductor (CMOS)) and generates a captured image. The sensor 2507 may include a set of sensors, such as a measurement sensor, a gyroscope sensor, a geomagnetic sensor and an acceleration sensor. The microphone 2508 converts sound inputted into the smart phone 2500 into an audio signal. The input apparatus 2509 includes for example a touch sensor configured to detect touch on a screen of the display apparatus 2510, a keypad, a keyboard, a button or a switch, and receives an operation or information inputted from a user. The display apparatus 2510 includes a screen (such as a liquid crystal display (LCD) and an organic light emitting diode (OLED) display), and displays an output image of the smart phone 2500. The speaker 2511 converts the audio signal outputted from the smart phone 2500 into sound.

The radio communication interface 2512 supports any cellular communication scheme (such as LTE and LTE-advanced). and performs wireless communication. The radio communication interface 2512 may generally include for example a BB processor 2513 and an RF circuit 2514. The BB processor 2513 may perform encoding/decoding, modulating/demodulating and multiplexing/de-multiplexing for example, and perform various types of signal processing for wireless communication. Meanwhile, the RF circuit 2514 may include for example a mixer, a filter and an amplifier, and transmits and receives a wireless signal via an antenna 2516. The radio communication interface 2512 may be a chip module on which a BB processor 2513 and the RF circuit 2514 are integrated. As shown in FIG. 17, the radio communication interface 2512 may include multiple BB processors 2513 and multiple RF circuits 2514. Although FIG. 17 shows an example in which the radio communication interface 2512 includes multiple BB processors 2513 and multiple RF circuits 2514, the radio communication interface 2512 may include a single BB processor 2513 or a single RF circuit 2514.

In addition to the cellular communication scheme, the radio communication interface 2512 may support other types of wireless communication schemes, such as a short distance wireless communication scheme, a near field communication scheme and a wireless local area network (LAN) scheme. In this case, the radio communication interface 2512 may include a BB processor 2513 and an RF circuit 2514 for each type of wireless communication scheme.

Each of the wireless switches 2515 switches a connection destination of the antenna 2516 between multiple circuits (for example circuits for different wireless communication schemes) included in the radio communication interface 2512.

Each of the antennas 2516 includes a single or multiple antenna elements (such as multiple antenna elements included in the MIMO antenna), and is used for the radio communication interface 2512 to transmit and receive a wireless signal. As shown in FIG. 17, the smart phone 2500 may include multiple antennas 2516. Although FIG. 21 shows an example in which the smart phone 2500 includes multiple antennas 2516. the smart phone 2500 may include a single antenna 2516.

In addition, the smart phone 2500 may include an antenna 2516 for each type of wireless communication scheme. In this case, the antenna switch 2515 may be omitted from the configuration of the smart phone 2500.

The bus 2517 connects the processor 2501, the memory 2502, the storage apparatus 2503, the external connection interface 2504, the camera 2506, the sensor 2507, the microphone 2508, the input apparatus 2509, the display apparatus 2510, the loudspeaker 2511. the radio communication interface 2512 and the auxiliary controller 2519 with each other. The battery 2518 supplies power for blocks in the smart phone 2500 shown in FIG. 10 via a feeder which is indicated partially as a dashed line in the figure. The auxiliary controller 2519 controls a minimum necessary function of the smart phone 2500 in a sleeping mode, for example.

In the smartphone 2500 shown in FIG. 17, the transceiving device of the wireless communication apparatus for the mobile terminal side according to the embodiment of the present disclosure may be implemented by the radio communication interface 2512. At least a portion of functions of processing circuits and/or units in the electronic device or the wireless communication apparatus for the mobile terminal side according to the embodiments of the present disclosure may be achieved by the processor 2501 or the auxiliary controller 2519. For example, the auxiliary controller 2519 may achieve a portion of functions of the processor 2501, to reduce power consumption of the battery 2518. In addition, the processor 2501 or the auxiliary controller 2519 may achieve at least a portion of functions of the processing circuits and/or units in the electronic device or the wireless communication apparatus for the mobile terminal side according to the embodiment of the present disclosure, by executing programs stored in the memory 2502 or the storage device 2503.

Application Example on a Base Station

Figure 18:
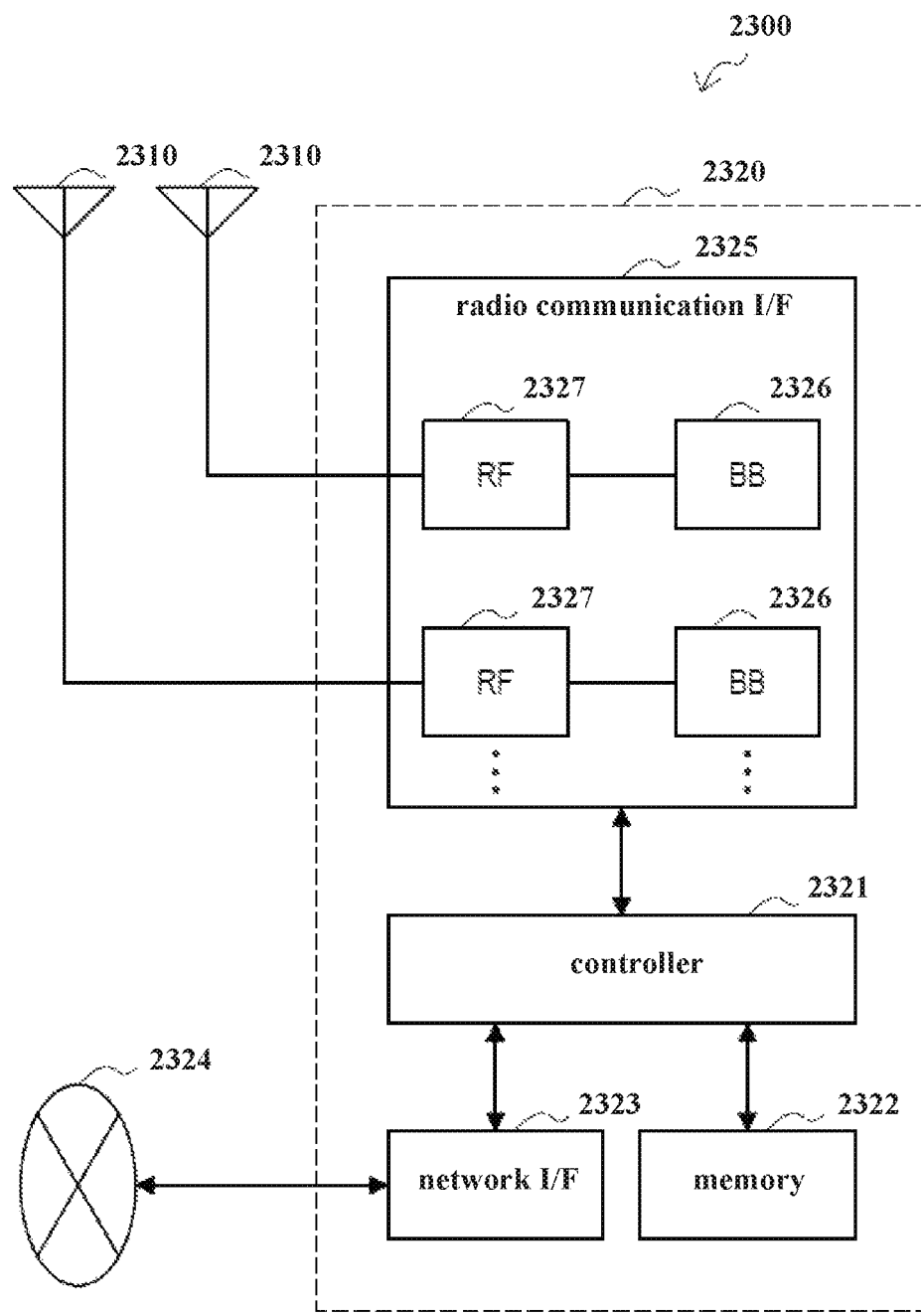
FIG. 18 is a block diagram showing an example of a schematic configuration of an eNB (evolved node b) to which the technology of the present disclosure may be applied.

FIG. 18 is a block diagram showing an example of a schematic configuration of an eNB to which the technology according to the present disclosure may be applied. An eNB 2300 includes one or more antennas 2310 and a base station device 2320. The base station device 2320 may be connected to each of the antennas 2310 via a radio frequency (RF) cable.

Each of the antennas 2310 includes one or more antenna elements (such as multiple antenna elements included in a multiple-input multiple-output (MIMO) antenna), and is for the base station device 2320 to transmit and receive a wireless signal. As shown in FIG. 18, the eNB 2300 may include multiple antennas 2310. For example, the multiple antennas 2310 may be compatible with multiple frequency bands used by the eNB 2300. Although FIG. 18 shows the example in which the eNB 2300 includes multiple antennas 2310, the eNB 2300 may include a single antenna 2310.

The base station device 2320 includes a controller 2321, a memory 2322. a network interface 2323 and a radio communication interface 2325.

The controller 2321 may be for example a CPU or a DSP, and operates various functions of a high layer of the base station device 2320. For example, the controller 2321 generates a data package based on data of a signal processed by the radio communication interface 2325, and transfers the generated package via the network interface 2323. The controller 2321 may bundle data from multiple baseband processors to generate a bundling package, and transfers the generated bundling package. The controller 2321 may have a logical function for performing the following controls: radio resource control, radio bearer control, mobility management, admission control and scheduling. The control may be performed in conjunction with a nearby eNB or core network node. The memory 2322 includes RAM and ROM, and stores programs to be executed by the controller 2321 and various types of control data (such as a terminal list, transmission power data and scheduling data).

The network interface 2323 is a communication interface for connecting the base station device 2320 to a core network 2324. The controller 2321 may communicate with a core network node or another eNB via the network interface 2323. In this case, the eNB 2300 may be connected with the core network node or other eNBs via a logic interface (such as an interface S1 and an interface X2). The network interface 2323 may be a wired communication interface or a radio communication interface for wireless backhaul routing. If the network interface 2323 is a radio communication interface, the network interface 2323 may use a frequency band for wireless communication higher than that used by the radio communication interface 2325.

The radio communication interface 2325 supports any cellular communication scheme (such as Long Term Evolution (LTE) and LTE-advanced), and provides a wireless connection to a terminal located in a cell of the eNB 2300 via the antenna 2310. The radio communication interface 2325 may generally include for example a baseband (BB) processor 2326 and an RF circuit 2327. The BB processor 2326 may perform for example coding/decoding. modulation/demodulation and multiplexing/demultiplexing, and performs various types of signal processing of layers (such as L1, Media Access Control (MAC), Radio Link Control (RLC) and Packet Data Convergence Protocol (PDCP)). Instead of the controller 2321. the BB processor 2326 may have a portion or all of the above logical functions. The BB processor 2326 may be a memory storing communication control programs, or a module including a processor and a related circuit which are configured to execute programs. The function of the BB processor 2326 may be changed when the programs are updated. The module may be a card or blade inserted into the slot of the base station device 2320. Alternatively, the module may be a chip mounted on the card or the blade. Meanwhile, the RF circuit 2327 may include for example a frequency mixer, a filter and an amplifier, and transmit and receive a wireless signal via the antenna 2310.

As shown in FIG. 18, the radio communication interface 2325 may include multiple BB processors 2326. For example, the multiple BB processors 2326 may be compatible with the multiple frequency bands used by the eNB 2300. As shown in FIG. 18, the radio communication interface 2325 may include multiple RF circuits 2327. For example, the multiple RF circuits 2327 may be compatible with multiple antenna elements. Although FIG. 18 shows an example in which the radio communication interface 2325 includes multiple BB processors 2326 and multiple RF circuits 2327, the radio communication interface 2325 may include a single BB processor 2326 or a single RF circuit 2327.

In the eNB2300 shown in FIG. 18, the transceiving device of the wireless communication apparatus for the base station side according to the embodiment of the present disclosure may be implemented by the radio communication interface 2325. At least a portion of functions of the processing circuits and/or the units in the electronic device or the wireless communication apparatus for the base station side according to the embodiment of the present disclosure may be implemented by by the controller 2321. For example, the controller 2321 may achieve at least a portion of functions of the processing circuits and/or the units of the electronic device or the wireless communication apparatus for the base station side according to the embodiment of the present disclosure by performing programs stored in the memory 2322.

Application Example on an Automobile Navigation Device

Figure 19:
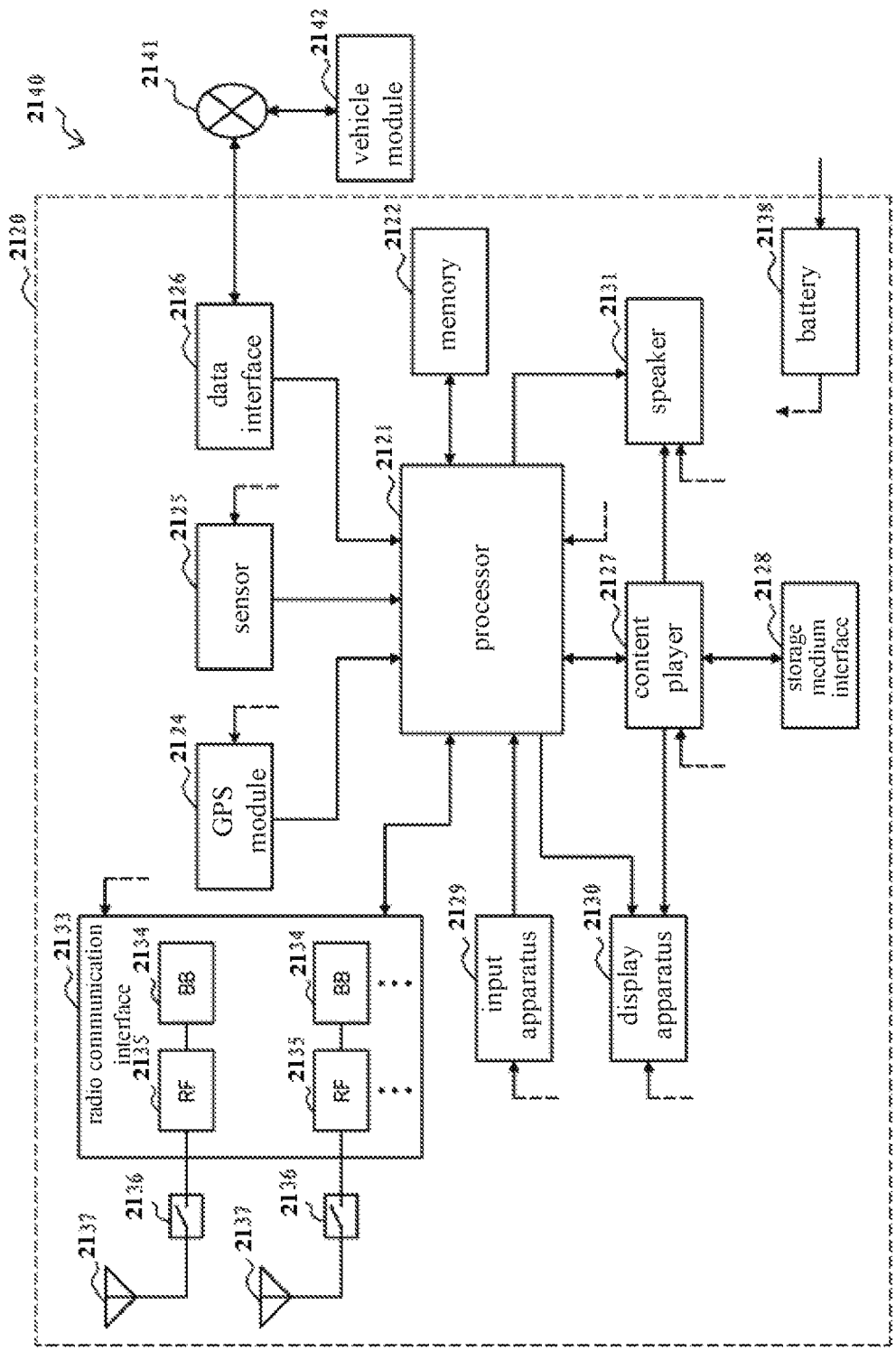
FIG. 19 is a block diagram showing an example of a schematic configuration of an automobile navigation apparatus to which the technology of the present disclosure may be applied.

FIG. 19 is a block diagram showing an example of a schematic configuration of an automobile navigation device 2120 to which the technology of the present disclosure may be applied. The automobile navigation device 2120 includes a processor 2121, a memory 2122, a global positioning system (GPS) module 2124, a sensor 2125, a data interface 2126, a content player 2127, a storage medium interface 2128, an input apparatus 2129, a display apparatus 2130, a speaker 2131, a radio communication interface 2133, one or more antenna switches 2136, one or more antennas 2137 and a battery 2138.

The processor 2121 may be a CPU or an SoC, and controls a navigation function and other functions of the automobile navigation device 2120. The memory 2122 includes an RAM and an ROM. and stores programs executed by the processor 2121 and data.

The GPS module 2124 measures a position of the automobile navigation device 2120 (such as a latitude, a longitude and a height) by using a GPS signal received from a GPS satellite. The sensor 2125 may include a set of sensors, such as a gyroscope sensor, a geomagnetic sensor and an air pressure sensor. The data interface 2126 is connected to a vehicle network 2141 for example through a terminal not shown, and acquires data generated by the vehicle (such as vehicle speed data).

The content player 2127 reproduces contents stored in a storage medium (such as a CD and a DVD), and the storage medium is inserted into the storage medium interface 2128. The input apparatus 2129 includes for example a touch sensor configured to detect touch on a screen of the display apparatus 2130, a button or a switch, and receives an operation or information inputted from a user. The display apparatus 2130 includes a screen of an LCD or OLED display for example, and displays an image with a navigation function or the reproduced content. The speaker 2131 outputs a sound with a navigation function or the reproduced content.

The radio communication interface 2133 supports any cellular communication scheme (such as LTE and LTE-advanced), and performs wireless communication. The radio communication interface 2133 may generally include a BB processor 2134 and an RF circuit 2135 for example. The BB processor 2134 may perform encoding/decoding, modulating/demodulating and multiplexing/de-multiplexing, and perform various types of signal processing for wireless communication. Meanwhile, the RF circuit 2135 may include for example a mixer, a filter and an amplifier, and transmits and receives a wireless signal via the antenna 2137. The radio communication interface 2133 may also be a chip module on which the BB processor 2134 and the RF circuit 2135 are integrated. As shown in FIG. 19, the radio communication interface 2133 may include multiple BB processors 2134 and multiple RF circuits 2135. Although FIG. 19 shows an example in which the radio communication interface 2133 includes multiple BB processors 2134 and multiple RF circuits 2135. the radio communication interface 2133 may include a single BB processor 2134 or a single RF circuit 2135.

In addition to the cellular communication scheme, the radio communication interface 2133 may support other types of wireless communication schemes, such as a short distance wireless communication scheme, a near field communication scheme and a wireless LAN scheme. In this case, for each type of wireless communication scheme, the radio communication interface 2133 may include the BB processor 2134 and the RF circuit 2135.

Each of the antenna switches 2136 switches a connection destination of the antenna 2137 between multiple circuits (such as circuits for different wireless communication schemes) included in the radio communication interface 2133.

Each of the antennas 2137 includes a single or multiple antenna elements (such as multiple antenna elements included in the MIMO antenna), and is used for the radio communication interface 2133 to transmit and receive a wireless signal. As shown in FIG. 19, the automobile navigation device 2120 may include multiple antennas 2137. Although FIG. 21 shows an example in which the automobile navigation device 2120 includes multiple antennas 2137, the automobile navigation device 2120 may include a single antenna 2137.

In addition, the automobile navigation device 2120 may include the antenna 2137 for each type of wireless communication scheme. In this case, the antenna switch 2136 may be omitted from the configuration of the automobile navigation device 2120.

The battery 2138 supplies power for blocks in the automobile navigation device 2120 shown in FIG. 19 via a feeder which is indicated partially as a dashed line in the figure. The battery 2138 accumulates power provided by the vehicle.

In the automobile navigation device 2120 shown in FIG. 19, the transceiving device of the wireless communication apparatus for the mobile terminal side according to the embodiment of the present disclosure may be implemented by the radio communication interface 2133. At least a portion of functions of processing circuits and/or units of the electronic device or the wireless communication apparatus for the mobile terminal side according to the embodiment of the present disclosure may be implemented by the processor 2121.

The technology of the present disclosure may be implemented as a vehicle-mounted system (or a vehicle) 2140 including one or more of the automobile navigation device 2120, the vehicle network 2141 and a vehicle module 2142. The vehicle module 2142 generates vehicle data (such as a vehicle speed, an engine speed and fault information), and outputs the generated data to the vehicle network 2141.

In the above description of the embodiments of the present disclosure, features that are described and/or illustrated with respect to one embodiment may be used in the same way or in a similar way in one or more other embodiments, may be combined with or instead of the features of the other embodiments.

It should be emphasized that the term "comprises/comprising" used in this specification refers to the presence of features, elements, steps or components, but does not preclude the presence or addition of one or more other features, elements, steps or components.

In the above embodiments and examples, the steps and/or units are represented with reference numbers consists of numbers. It should be understood by those skilled in the art that, these reference numbers are only for convenience of the description and drawing, and are not intended to represent an order of the steps and units or to represent any other constraint.

In addition, the methods according to the present disclosure are not limited to be executed in the time sequence described in the specification, and may be executed in other time sequence, parallel or independently. Therefore, the execution order of the method described in the specification is not intended to limit the technical scope of the present disclosure.

While the present disclosure has been disclosed with reference to the specific embodiments thereof, it should be understood that all of the above embodiments and examples are illustrative rather than restrictive. Those skilled in the art will appreciate that various modifications, improvements and equivalents are possible, without departing from the spirit and scope of the appended claims. These modifications, improvements or equivalents are intended to be included within the protection scope of the present disclosure.

The invention claimed is:

1. An electronic device housed at a base station, comprising: a processing circuit configured to:
    acquire information of a time-difference-of-arrival to generate diversity signals, to be transmitted from two or more base stations, to a mobile terminal;
    determine an open loop pre-coding matrix for each respective transmission of the diversity signals based on the acquired information, so that an influence of the time-difference-of-arrival on a diversity gain is reduced; and
    pre-code each signal to be transmitted with the respective determined pre-coding matrix;
    wherein the acquired information is used to determine the open loop pre-coding matrix prior to receiving a pre-coding matrix index (PMI) value from the mobile terminal, and
    the acquired information includes position information of the mobile terminal, and the acquired information includes a determination of distances between position coordinates of the mobile terminal relative to both position coordinates of the two or more base stations, wherein the electronic device determines the distances to estimate the time-difference-of-arrival used to determine the open-loop pre-coding matrixes used to transmit the diversity signals.

2. The electronic device according to claim 1, wherein the determination of the pre-coding matrix comprises: compensating a difference of channel parameters of symbols involved in transmission diversity coding according to the time-difference-of-arrival, so that orthogonality of the pre-coding matrix is improved as compared with a case where the time-difference-of-arrival is not considered.

3. The electronic device according to claim 1, wherein the pre-coding matrix contains a phase rotation factor determined according to the time-difference-of-arrival, the rotation factor causing a phase rotation of a coded symbol transmitted on at least one sub-carrier.

4. The electronic device according to claim 1, wherein the determination of the open loop pre-coding matrix comprises constructing the open loop pre-coding matrix or selecting the open loop pre-coding matrix from predetermined candidate matrices.

5. The electronic device according to claim 4, wherein the processing circuit is further configured to:
cause a transmitter to transmit a pre-coded signal to the mobile terminal, based on the open loop pre-coding matrix; and
determine a closed loop pre-coding matrix by:
receiving the mobile generated PMI value; and
selecting or constructing a closed-loop pre-coding matrix from the mobile generated PMI value.

6. The electronic device according to claim 4, wherein the processing circuit is further configured to:
cause a transmitter to transmit a pre-coded signal to the mobile terminal, based on the open loop pre-coding matrix;
cause a transmitter to transmit a measurement control signal to the mobile terminal; and
determine a closed loop pre-coding matrix by:
acquiring the pre-coding matrix index value reported from the mobile terminal; and
determining a closed-loop pre-coding matrix according to a predetermined correspondence between pre-coding matrix index values and the candidate matrices.

7. The electronic device according to claim 1, wherein the processing circuit is further configured to:
acquire information on a speed of the mobile terminal or information on quantization granularity of the time-difference-of-arrival; and
determine a period for reporting information on the time-difference-of-arrival by the mobile terminal according to the speed or the quantization granularity.

8. The electronic device according to claim 1, wherein the mobile terminal comprises a vehicle and the base station comprises a Road-Side Unit.

9. A wireless communication apparatus housed at a base station, comprising:
a transceiving device; and
a processing circuit configured to:
acquire information of a time-difference-of-arrival to generate diversity signals, to be transmitted from two or more base stations, to a mobile terminal;
determine an open loop pre-coding matrix for each respective transmission of the diversity signals based on the acquired information, so that an influence of the time-difference-of-arrival on a diversity gain is reduced;
pre-code each signal to be transmitted with the respective determined pre-coding matrix; and
control the transceiving device to transmit the pre-coded signal;
wherein the acquired information is used to determine the open loop pre-coding matrix prior to receiving a pre-coding matrix index (PMI) value from the mobile terminal, and
the acquired information includes position information of the mobile terminal, and the acquired information includes a determination of distances between position coordinates of the mobile terminal relative to both position coordinates of the two or more base stations, wherein the electronic device determines the distances to estimate the time-difference-of-arrival used to determine the open-loop pre-coding matrixes used to transmit the diversity signals.

10. A wireless communication method performed by a base station, comprising:
acquiring information of a time-difference-of-arrival to generate diversity signals, to be transmitted from two or more base stations to a mobile terminal;
determining an open loop pre-coding matrix for each respective transmission of the diversity signals based on the acquired information so that an influence of the time-difference-of-arrival on a diversity gain is reduced; and
pre-coding each signal to be transmitted with the respective determined pre-coding matrix;
wherein the acquired information is used to determine the open loop pre-coding matrix prior to receiving a pre-coding matrix index (PMI) value from the mobile terminal, and
the acquired information includes position information of the mobile terminal, and the acquired information includes a determination of distances between position coordinates of the mobile terminal relative to both position coordinates of the two or more base stations, wherein the electronic device determines the distances to estimate the time-difference-of-arrival used to determine the open-loop pre-coding matrixes used to transmit the diversity signals.

11. An electronic device housed at a mobile terminal, comprising: a processing circuit configured to:
perform control to receive, from two or more base stations, diversity signals each of which are pre-coded with a pre-coding matrix,
wherein each pre-coding matrix is determined based on acquired information used to determine a time-difference-of-arrival of diversity signals transmitted from the two or more base stations to the mobile terminal, so that an influence of the time-difference-of-arrival on a diversity gain is reduced;
wherein the acquired information is used to determine an open loop pre-coding matrix prior to the mobile terminal sending a pre-coding matrix index (PMI) value, and
the diversity signals transmitted from the two or more base stations use the pre-coding matrices that were generated from the acquired information including position information of the mobile terminal, and the acquired information includes a determination of distances between position coordinates of the mobile terminal relative to both position coordinates of the two or more base stations.

12. The electronic device according to claim 11, wherein the processing circuit is further configured to:
determine a measured time-difference-of-arrival; and
perform control to transmit information on the measured time-difference-of-arrival to at least one base station of the two or more base stations.

13. The electronic device according to claim 11, wherein the processing circuit is further configured to:
determine a measured time-difference-of-arrival;
determine a pre-coding matrix index value according to the measured time-difference-of-arrival based on a predetermined correspondence; and
perform control to transmit the pre-coding matrix index value to at least one base station of the two or more base stations.

14. The electronic device according to claim 12, wherein the processing circuit is further configured to:
perform control to transmit information on the time-difference-of-arrival with a predetermined period,
wherein the predetermined period is determined based on a speed of the mobile terminal or quantization granularity of the time-difference-of-arrival.

15. A wireless communication apparatus housed at a mobile terminal, comprising:
 a transceiving device; and
 a processing circuit configured to:
 control the transceiving device to receive, from two or more base stations, diversity
 signals each of which are pre-coded with a pre-coding matrix,
 wherein each pre-coding matrix is determined based on acquired information on a time-difference-of-arrival of diversity signals transmitted from the two or more base stations to the mobile terminal, so that an influence of the time-difference-of-arrival on a diversity gain is reduced;
 wherein the acquired information is used to determine an open loop pre-coding matrix prior to the mobile terminal sending a pre-coding matrix index (PMI) value, and
 the diversity signals transmitted from the two or more base stations use the pre-coding matrices that were generated from the acquired information including position information of the mobile terminal, and the acquired information includes a determination of distances between position coordinates of the mobile terminal relative to both position coordinates of the two or more base stations.

16. A wireless communication method performed by a mobile terminal, comprising:
 receiving, from two or more base stations, diversity signals each of which are pre-coded with a pre-coding matrix,
 wherein each pre-coding matrix is determined based on acquired information on a time-difference-of-arrival of diversity signals transmitted from the two or more base stations to the mobile terminal, so that an influence of the time-difference-of-arrival on a diversity gain is reduced;
 wherein the acquired information is used to determine an open loop pre-coding matrix prior to the mobile terminal sending a pre-coding matrix index (PMI) value, and
 the diversity signals transmitted from the two or more base stations use the pre-coding matrices that were generated from the acquired information including position information of the mobile terminal, and the acquired information includes a determination of distances between position coordinates of the mobile terminal relative to both position coordinates of the two or more base stations.

17. The electronic device according to claim 1, wherein the processing circuit is further configured to:
 acquire information on a speed of the mobile terminal and information on quantization granularity of the time-difference-of-arrival; and
 determine a period for reporting information on the time-difference-of-arrival by the mobile terminal according to the speed and the quantization granularity.

18. The electronic device according to claim 11, wherein the mobile terminal comprises a vehicle and the base station comprises a Road-Side Unit.

19. The electronic device according to claim 12, wherein the processing circuit is further configured to:
 perform control to transmit information on the time-difference-of-arrival with a predetermined period,
 wherein the predetermined period is determined based on a speed of the mobile terminal and quantization granularity of the time-difference-of-arrival.

* * * * *